United States Patent
Galime

(10) Patent No.: US 10,097,366 B2
(45) Date of Patent: Oct. 9, 2018

(54) METHODS, SYSTEMS, AND COMPUTER READABLE MEDIA FOR MONITORING LATENCY AND/OR TIME-BASED DATA LOCATIONS OF MULTICAST COMMUNICATIONS

(71) Applicant: Keysight Technologies Singapore (Holdings) Pte. Ltd, Minneapolis, MN (US)

(72) Inventor: Michael Paul Galime, Utica, NY (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 2 days.

(21) Appl. No.: 14/626,863

(22) Filed: Feb. 19, 2015

(65) Prior Publication Data
US 2016/0248650 A1    Aug. 25, 2016

(51) Int. Cl.
*H04L 12/18* (2006.01)
*H04L 12/26* (2006.01)

(52) U.S. Cl.
CPC ...... *H04L 12/1845* (2013.01); *H04L 12/1863* (2013.01); *H04L 43/087* (2013.01); *H04L 43/106* (2013.01); *H04L 43/16* (2013.01)

(58) Field of Classification Search
CPC .................................................. H04L 65/4076
See application file for complete search history.

(56) References Cited

U.S. PATENT DOCUMENTS

| | | | | |
|---|---|---|---|---|
| 2006/0018257 A1* | 1/2006 | Seo | ........................ | H04L 1/0002 370/232 |
| 2007/0268882 A1* | 11/2007 | Breslau | ................. | H04L 43/026 370/346 |
| 2010/0303100 A1* | 12/2010 | Niamut | .................... | H04L 65/80 370/503 |
| 2015/0134769 A1* | 5/2015 | Cao | ........................ | H04W 28/08 709/213 |
| 2015/0172984 A1* | 6/2015 | Racz | ................... | H04W 56/001 370/331 |

OTHER PUBLICATIONS

"CPacket cTap Latency Probe," cpacket Networks, http://cpacket.com/wp-content/files_mf/ctaplp_product_brief.pdf, pp. 1-2 (Downloaded from the Internet Feb. 19, 2015).

* cited by examiner

*Primary Examiner* — Huy D Vu
*Assistant Examiner* — Kevin M Cunningham

(57) ABSTRACT

Methods, systems, and computer readable media for monitoring latency and/or time-based data locations of multicast communications are disclosed. One exemplary method includes monitoring sequence numbers of multicast messages at a plurality of physical network locations, reporting when a sequence number value for the multicast messages reaches a predetermined value, and receiving the reports and using the reports to generate an indication of relative latencies and/or time-based data locations across the physical network locations.

17 Claims, 5 Drawing Sheets

METHODS, SYSTEMS, AND COMPUTER READABLE MEDIA FOR MONITORING LATENCY AND/OR TIME-BASED DATA LOCATIONS OF MULTICAST COMMUNICATIONS

TECHNICAL FIELD

The subject matter described herein relates to monitoring latency associated with communicating data in a network. More specifically, the subject matter relates to methods, systems, and computer readable media for monitoring latency and/or time-based data locations of multicast communications.

BACKGROUND

Multicast communications are those in which one or more senders transmit a data stream or data feed to multiple different receivers using multiple different channels. That is, multicast communications include packet data feeds that are addressed to a group of destinations simultaneously. Individual packets of a multicast data feed are embedded with monotonically increasing sequence numbers, so that dropped or lost packets may be more easily detected. Currently, the embedded or encoded sequence numbers associated with multicast data packets are only analyzed to determine whether there are gaps in the data, for example, by determining which packet sequence numbers were not received by a receiver or receiving endpoint.

In multicast communications, it is desirable to measure packet latency, where latency is defined as the relative delay in delivery of the same multicast packet to different network locations. This is especially true in the field of financial market and stock exchange communications. In some aspects, receivers may even pay a premium price to guarantee receipt of exchange communications over a low latency channel. Thus, it is useful to monitor and calculate respective channel latency in real-time, for example, to diagnose and hopefully resolve communication issues. Currently, there is not a simple, inexpensive, and real-time or near real-time method of monitoring and calculating latency within a multicast network.

Accordingly, a need exists for improved methods, systems, and computer readable media for monitoring latency of multicast communications

SUMMARY

Methods, systems, and computer readable media for monitoring latency associated with multicast communications are disclosed. According to one exemplary method, sequence numbers of multicast messages (e.g., packets, multiple messages within packets, messages spread across multiple packets, etc.) are monitored at a plurality of physical network locations. The method further comprises, at each physical network location, reporting when a sequence number value for the multicast messages reaches a predetermined value. The method further comprises, at a latency determination server (LDS), receiving the reports and using the reports to generate an indication of relative latencies and/or time-based data locations across the physical network locations.

According to one exemplary system, the system comprises a plurality of physical network locations for monitoring sequence numbers of multicast messages. Each physical network location is configured to generate and report when a sequence number value for the multicast messages reaches a predetermined value. The system further comprises a latency determination server (LDS) for receiving reports from the plurality of physical network locations and using the reports to generate an indication of the relative latencies and/or time-based data locations across the physical network locations.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps.

Exemplary computer readable media suitable for implementing the subject matter described herein include non-transitory devices, such as disk memory devices, chip memory devices, programmable logic devices, field-programmable gate arrays (FPGAs), and/or application specific integrated circuits (ASICs). In addition, a computer readable medium that implements the subject matter described herein may be located on a single device or computing platform or may be distributed across multiple devices or computing platforms.

As used herein, the term "node" refers to a physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for monitoring latency of multicast communications. Multicast communications (packets, multiple messages within packets, or messages spread across multiple packets) include embedded sequence numbers, referred to herein as sequence number identifier values. Notably, methods, systems, and computer readable media set forth herein are configured to utilize these pre-existing sequence numbers identifier values associated with packets to passively monitor latency associated with multicast communications, for example, by tracking the arrival time of each packet sequence identifier value at and/or between various physical locations (e.g., hops) in real-time, or near real-time. This information can be used to detect trouble spots within a multicast network so that network operators can identify, de-bug, and improve multicast communication efficiency.

The term "multicast data feeds", "multicast communications", and/or "multicast packets" refer to data feeds sent by at least one sender to multiple receivers, simultaneously. Multicast communications are those having a transport layer protocol including a User Datagram Protocol (UDP), a Pragmatic General Multicast (PGM), or any other suitable protocol.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
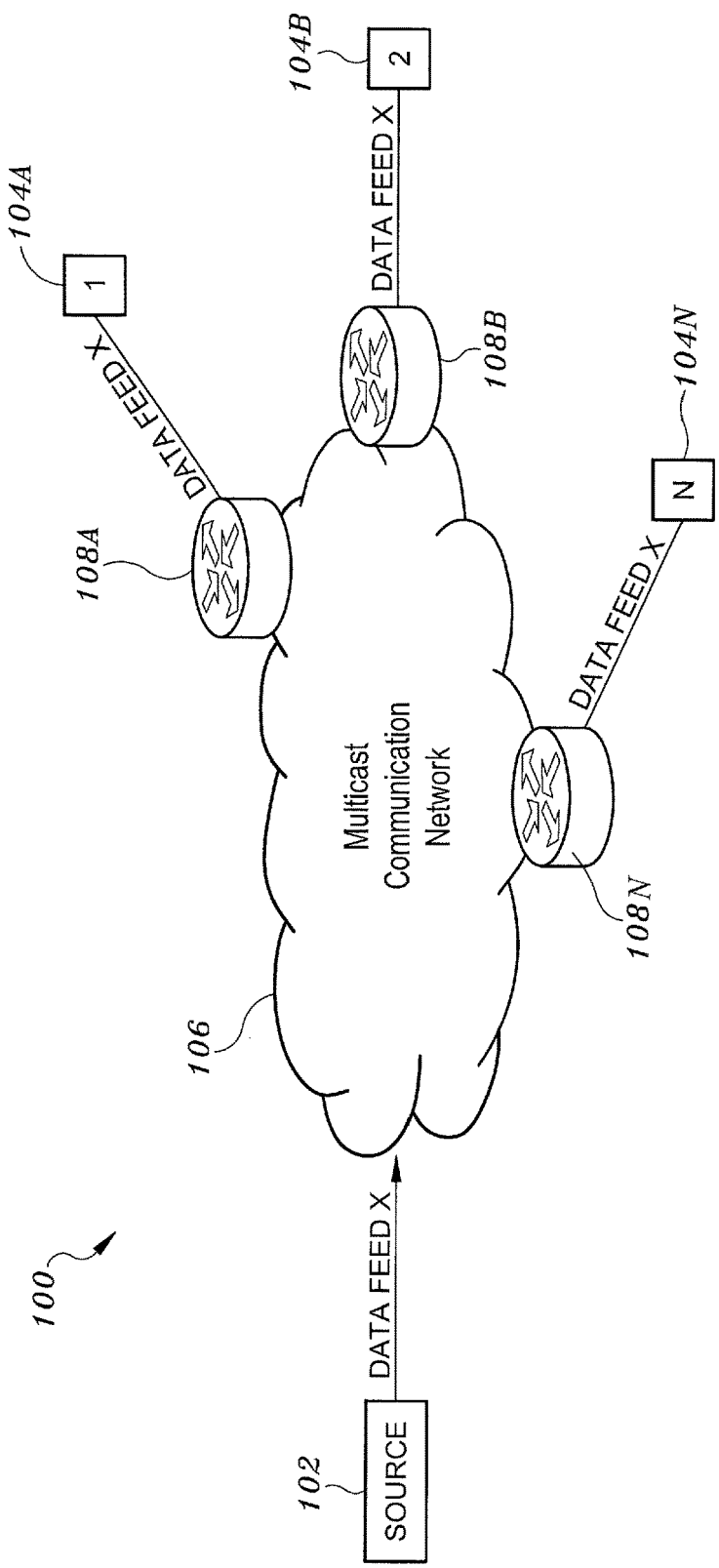
FIG. 1 is an exemplary network diagram for sending and receiving multicast communications according to an embodiment of the subject matter described herein.

FIG. 1 is an exemplary network diagram or network, generally designated 100, for sending and receiving multicast communications according to an embodiment of the subject matter described herein. Referring to FIG. 1, a data source 102 (e.g., endpoint or node) simultaneously transmits at least one data feed, designated "DATA FEED X", to a plurality of different endpoints, nodes or receivers, 104A, 104B, to 104N (wherein "N", as used in FIG. 1, refers to a whole number integer≥2), simultaneously. At least one data feed (e.g., DATA FEED X) may be communicated across a communication network 106. Communication network 106 may include the Internet, an Ethernet network, an IP network, a fiber network, a cable network, a microwave link, a cloud network, a Local Area Network (LAN), a Wide Area Network (WAN), a Metropolitan Area Network (MAN), a virtual network, etc., and/or combinations thereof. Sender 102 may include any suitable entity for sending multicast data, such as an exchange (e.g., stock market data feed source or exchange), multicast data messaging source, entity and/or enterprise entity. In some embodiments, network 100 includes multiple senders 102.

Each receiver 104A to 104N, is associated with at least one multicast routing device 108A, 108B, 108N, whereby DATA FEED X is transmitted from source 102 to the respective receiver 104A to 104N. In one embodiment, routing devices 108A to 108N are associated with a specific receiver 104A to 104N. In other embodiments, routing devices 108A to 108N are not specific to one receiver, but may service multiple receivers 104A to 104N. Any configuration or communication channels between sender 102 and each receiver 104A to 104N may be provided.

In some embodiments, routing devices 108A to 108N include a device that is one hop away from a receiver 104A to 104N, such that each receiver 104A to 104N communicates with other network infrastructure devices in network 100 via devices 108A to 108N. Examples of network infrastructure devices include, but are not limited to, routers, switches, hubs, packet brokers, filters, gateways, bridges, etc. Receivers 104A to 104N may include any suitable endpoint and/or multicast subscriber or subscribing entity, for example and not limited to, an individual entity or subscriber, a service provider, a financial service provider, a feed handler, etc. Receivers 104A to 104N may subscribe to a data stream or feed, a financial service data feed, or any other large type of data feed.

In some embodiments, devices 108A to 108N are adapted to receive a multicast stream or data feed via network 106 and transmit the data feed (e.g., DATA FEED X) to each receiver 104A to 104N. Data feeds (e.g., DATA FEED X) may be transmitted to each receiver 104A to 104N via one or more channels. Multicast data can be communicated using one or more channels between the source 102 and each receiver 104A to 104N. Notably, latency can be monitored at each physical device (e.g., hops, 108A to 108N) by tracking the arrival time of predetermined packet sequence numbers or values at the respective devices. In some embodiments, tracking the arrival time of every message or packet can also be tracked, where desired, and upon the tracking application.

Latency can be defined as the time interval between a time that sender 102 transmits DATA FEED X to a time that receivers 104A to 104N receive DATA FEED X. In the illustrated example, latency is monitored at routers (e.g., 108A to 108N). In an alternative example, latency may be monitored at network probes or other devices in the network 100. However, as each channel and/or devices thereof attribute to latency, DATA FEED X may be received by receivers 104A to 104N at different times. The present subject matter is aimed at monitoring latency of channels and/or channel devices (e.g., 108A, 108B, etpackets (or messages within the individual data packets) and/or characterizing overall latency within network 100. For example and in some embodiments, each channel transmits a data feed in which packets thereof have monotonically increasing sequence numbers. Latency may be monitored by tracking a message arrival time at all data points within network 100 and/or multicast communications and/or multicast paths thereof, thereby allowing for novel latency monitoring and calculation processes. Similarly, the physical location of any given message carrying data may also be monitored or tracked by tracking a message arrival time at all data points within network 100 and/or channels thereof.

It will be appreciated that FIG. 1 is shown for illustrative purposes and that various nodes, their locations, and/or their functions described above in relation to FIG. 1 may be changed, altered, added, or removed. For example, some nodes and/or functions may be combined into a single entity. One skilled in the art will recognize that FIG. 1 is merely a representation of a simplified network for the purpose of illustrating the present embodiment of the present subject matter, and is not to be limited by the number of sources 102, receivers 104N, hops or routers 108N, etc. In accordance with an embodiment of the present subject matter, network 100 is a multicast network, where at least one source 102 transmits multicast streams or data feeds to multiple receivers 104N simultaneously. Nodes, and/or functionality of FIG. 1 may be combined into a single entity without departing from the scope of the instant subject matter.

Figure 2:
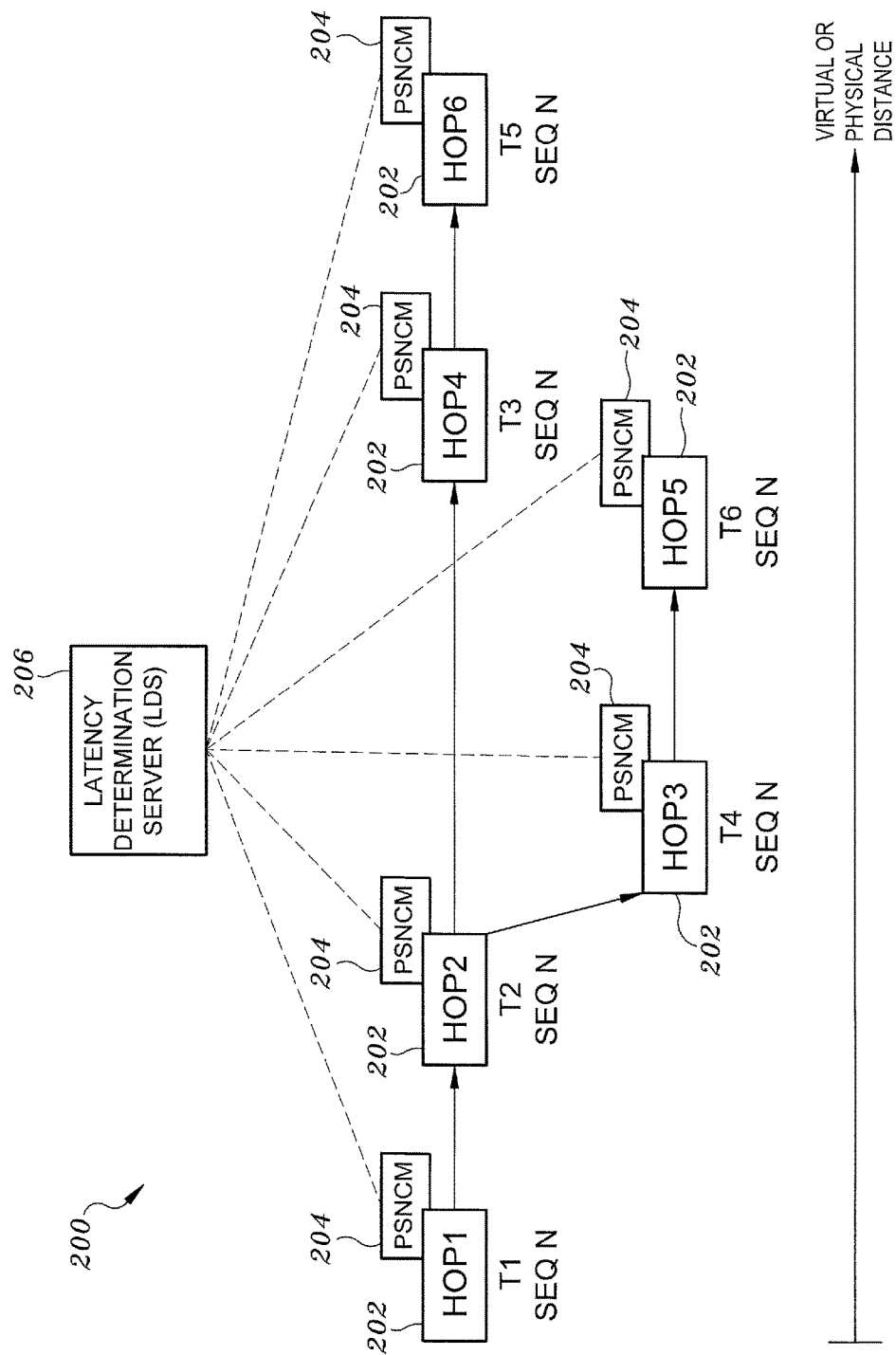
FIG. 2 is a schematic block diagram illustrating exemplary routing of a multicast communication according to an embodiment of the subject matter described herein.

FIG. 2 is a schematic block diagram illustrating exemplary routing of a multicast communication via a multicast communication path, generally designated 200, according to an embodiment of the subject matter described herein. Path 200 includes multiple hops 202, which are illustrated as increasing in number (e.g., HOP1, HOP2 . . . HOP6, etc.) with increasing distance. As the arrowed line at the bottom of FIG. 2 illustrates, hop 202 numbers increase with increasing virtual and/or physical distance along path 200. Hops 202 may include any network infrastructure, node, or device, for example, not limited to a router, switch, hub, bridge, gateway, a probe, a network tool optimizer (NTO) associated with a router, etc. In some embodiments, latency monitoring devices may be configured to passively monitor messages received at each hop 202, and generate and send a latency monitoring reports to a latency determination server (LDS) 206.

In some embodiments, latency monitoring devices described herein include packet sequence number counting modules (PSNCMs) 204 adapted to passively monitor sequence numbers associated with multicast packets (e.g., multicast streams or data feeds). One PSNCM 204 may be associated with each specific hop 202 or one PSNCM 204 may be associated with multiple hops 202. Each PSNCM 204 is configured to receive a multicast packet, determine a packet sequence number identifier value, compare the packet sequence number to a previously stored packet sequence number identifier value, and generate and transmit a monitoring message to LDS 206 in response to determining that the received packet sequence number identifier value exceeds a predetermined threshold value.

In some embodiments, communication path 200 is configured to relay a data feed in which packets (or messages within the individual data packets) have monotonically increasing packet sequence numbers, which include binary identifier values. The predetermined threshold value may include any sequence number value. In one example, the threshold value corresponds to the rollover or maximum sequence number value for a given data feed. The predetermined threshold value may be set to any predetermined value based upon the sender's (e.g., 102, FIG. 1) and/or the receiver's (e.g., 104N) needs.

As FIG. 2 illustrates, a multicast communication having a packet sequence number identifier value, designated "SEQ N", is received at HOP1 at time T1. The multicast packet (or message within a packet) having sequence number identifier value SEQ N is received at HOP2 at time T2. The multicast packet having packet sequence number identifier value SEQ N is received at HOP4 at time T3, and then at HOP3 at time T4. The time difference between T1 to T4 can be used to determine relative latency. Ideally, SEQ N would have been received at HOP3 at time T3, as it is closer in distance to HOP2 than HOP4. However, latency was introduced within path 200 at some point between HOP2 and HOP4 such that SEQ N was not received at HOP3 until T4. The packet sequence number identifier value SEQ N is received at HOP6 at time T5 and at HOP5 at time T6.

Notably, at least one PSNCM 204 is configured to monitor latency at each hop 202 and/or perform time-based data location tracking by decoding each packet to extract the embedded sequence number identifier value (e.g., SEQ N, which is typically a monotonically increasing binary value), comparing the extracted value to a previously stored sequence number identifier value, and generating/transmitting a report to LDS 206 when a predetermined threshold value is met and/or exceeded. In some embodiments, the predetermined threshold value includes any number at which a packet sequence number comparator determines is met or exceeded based upon a count, for example, a predetermined power of two (e.g., $2^1$, $2^2$, $2^3$, $2^4$, etc.), according to a customer need.

As the broken lines in FIG. 2 illustrated and in some embodiments, each PSNCM 204 is configured to generate and transmit a monitoring report to LDS 206 when the predetermined threshold value is met. The determination as to whether the predetermined threshold value is met is based upon comparison of packet sequence numbers via a comparator residing at each PSNCM 204. The report may be carried in a log message (e.g., a syslog message) or other suitable message for logging events related to the passive monitoring of latency via the incremental counting or comparing and time stamping of specific message having specific sequence number identifier values. Syslog includes a client/server protocol that usually includes a syslog sender (e.g., PSNCM 204) sending a syslog message to a syslog receiver (e.g., LDS 206) within an IP network. A typical syslog message is a small (i.e., less than 1 kilobyte) text message. The syslog protocol is generally supported by a wide variety of devices and receivers across multiple platforms, and is often used to integrate data from any number of systems into a single data repository.

In some embodiments, latency of path 200 and/or components thereof is passively monitored via the plurality of PSNCMs 204 configured to monitor, log, and report the time at which an $N^{th}$ packet passes each hop 202, where "N" is user-configurable. When the sequence number identifier value increases to a certain point (e.g., the predetermined threshold), PSNCM 204 automatically generates and reports an event to LDS 206. LDS 206 may then generate and/or calculate a real-time latency metric based upon the time at which a given message (e.g., SEQ N) was received at each hop 202. For example, each PSNCM 204 may report to LDS 206 the time at which the monitored sequence number identifier value SEQ N was received at each hop 202, so that LDS 206 may then calculate and display an indication of latency, per device and/or channel, within a network to a user (e.g., sender or subscriber). LDS 206 may be configured to analyze and display a global indication of latency within a given network at any time throughout the day, as needed.

Notably, each of the plurality of PSNCMs 204 is synchronized to a clock and/or other synchronization device such that a packet arrival time of packets at each hop 202 is standardized using a synchronized time source. Thus, the arrival time of SEQ N, which is recorded, time stamped, and/or used to generate a monitoring message for use in latency metric calculation, is monitored via a synchronized device at each hop 202, and hop-to-hop.

It should be noted that PSNCM 204, LDS 206, the respective components and/or functionality thereof, as described herein, either alone or combined, constitute a special purpose computing device that improves the technological field of network testing and monitoring, for example, by monitoring (e.g., at each hop) the arrival time of packets (or messages within the individual data packets) via packet sequence number identification values, so that network latency of multicast data may be monitored, determined, calculated, and/or ultimately resolved. The arrival time of packets also enables time-based data location tracking within a network, so that the location and/or arrival times of data within a network can be tracked throughout a given time period.

It will be appreciated that FIG. 2 is shown for illustrative purposes and that various nodes, locations thereof, and/or functionality thereof described above in relation to FIG. 2 may be changed, altered, added, or removed. For example, some nodes and/or functionality may be combined into a single entity without departing from the scope of the instant subject matter.

Figure 3:
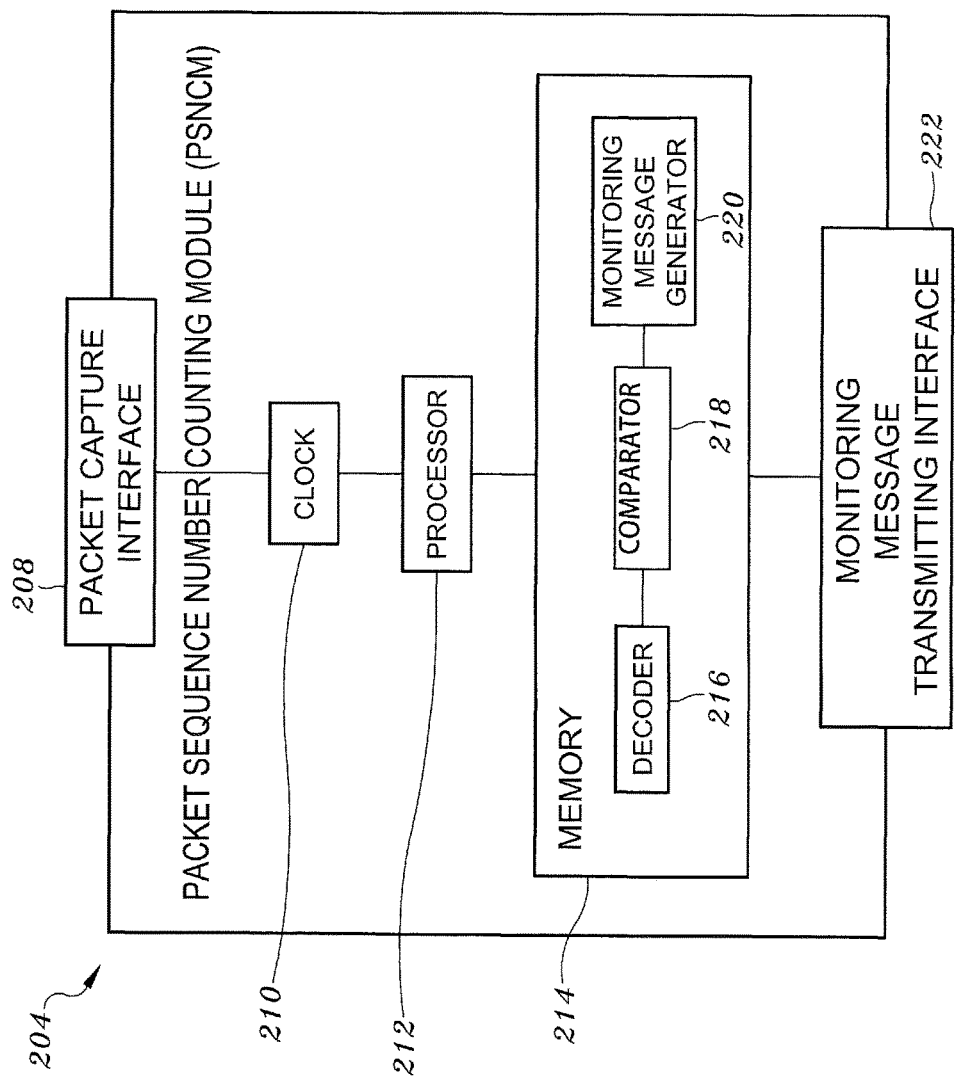
FIG. 3 is a schematic block diagram illustrating an exemplary module for monitoring latency associated with multicast communications according to an embodiment of the subject matter described herein.

FIG. 3 is a schematic block diagram of a system including PSNCM 204 for providing high-performance monitoring of multicast data feeds. PSNCM 204 is configured to monitor (e.g., passively) one or more channels and/or physical devices thereof for latency associated with multicast communications according to an embodiment of the subject matter described herein. PSNCM 204 may include any suitable entity or entities (e.g., a computing platform, software executing on a processor, etc.) for performing one or more aspects associated with monitoring latency of multicast communications.

Referring to FIG. 3, PSNCM 204 represents a computing platform, a network device, a network module, a node, or a system of devices, nodes, and/or modules. For example, PSNCM 204 may utilize field-programmable gate arrays (FPGAs) and/or application specific integrated circuits (ASICs) deployed at various hops along multiple channels to monitor multiple multicast channels (e.g., hundreds or thousands of channels) simultaneously for latency by analyzing the embedded sequence numbers associated with each multicast packet. PSNCM 204 is configured to generate and send an alert (e.g., a syslog message) to LDS 206 (FIG. 2) including a time stamp of when a binary rollover of the embedded sequence number was detected and a packet arrival time. LDS 206 (FIG. 2) then utilizes the information to calculate a latency metric (e.g., relative latency of and/or between physical network locations), and optionally display the latency metric associated with various channels to an end-user. In some embodiments, PSNCM 204 may include a single node deployed at a single hop or may include functionality distributed across multiple computing platforms or nodes for monitoring packet arrival times and sequence number identifier values at multiple hops.

In some embodiments, PSNCM 204 includes a packet capture interface 208, a clock 210, at least one processor 212, and at least one memory device or element 214. Processor 212 is configured to execute instructions stored in memory element 214. PSNCM 204 is configured to time stamp an arrival time of when a packet was received from the channel or wire for tracking packets in real-time as the packets go by the network device (e.g., hop, router, etc.). PSNCM 204 then reports the packet arrival time of a predetermined packet sequence number to LDS 206 (FIG. 2) via a syslog message for use in latency calculations. PSNCM 204 is configured to generate and report packet arrival times each time a predetermined threshold value is met, for example, every 32 messages, every 64 messages, etc., as determined by a packet comparator. In some embodiments, PSNCM 204 reports to LDS (FIG. 2), in real-time, the monitored device identifier (ID), the flow ID (e.g., in the form of a destination "IP:Port" address), the Tag ID (e.g., the sequence number identifier value), and a time stamp of sequence detection (e.g., the packet arrival time).

In some embodiments, packet capture interface 208 is configured to passively monitor packets passing through network devices, such as routers (hops), switches, hubs, gateways, etc. Packet capture interface 208 passively captures or receives a packet from a channel or wire, and processor 212 executes instructions stored in memory element 214 to decode the packet, increment a sequence number count, and generate a monitoring message when a predetermined threshold value (count) is met or exceeded, based upon the sequence number count.

PSNCM 204 includes a clock 210 that is synchronized to a universal clock along with every other clock in every other deployed monitoring device, so that the time stamping of packets and/or events (e.g., packet arrival time, packet sequence value arrival time, etc.) is globally synchronized across all devices and channels. Each packet may be decoded by decoder 216, time stamped with a time of arrival at PSNCM 204, and compared to a previously stored sequence number value via a packet sequence number comparator 218. When comparator 218 determines that a predetermined threshold value is exceeded (e.g., every 32 messages, every 64 messages, every 128 messages, etc.), monitoring message generator 220 is configured to generate an event (alert) message including at least the packet sequence number identifier value and the time stamp (e.g., packet arrival time) of the arrival time at which the packet sequence number identifier value was received at PSNCM 204. PSNCM 204 transmits the monitoring message (e.g., syslog alert or message) to LDS 206 (FIG. 2) via a monitoring message transmitting interface 222. Notably, the packet payloads and/or every packet bit do not need to be examined for the latency monitoring as described herein, which provides a more simplified and cost effective latency monitoring solution.

Decoder 216 extracts a packet sequence number identifier value. Comparator 218 compares the extracted sequence number identifier value to a previously stored sequence number. If comparator 218 determines that a predetermined threshold value is exceeded, monitoring message generator 220 generates and transmits a monitoring message to LDS (FIG. 2) that includes the packet sequence number identifier value, the time stamp, the device ID, and/or the flow ID. Comparator 218 will continue to compare extracted packet sequence number identifier values to previously stored values upon arrival of packet sequence number identifier values, and continue to prompt generation/transmission of monitoring messages each time the value exceeds the predetermined threshold (e.g., every 32 messages, 64 messages, 128 messages, etc.). The predetermined threshold values may be defined by a user, and may correspond to a binary rollover of the packet sequence number identifier values. PSNCM 204 is configured to monitor packets by receiving the packets, time stamping the packet arrival time, counting or comparing the packet sequence numbers, increasing a count by one for every packet received, and reporting a monitoring message to LDS 206 (FIG. 2) when the packet count exceeds a predetermined number.

It will be appreciated that FIG. 3 is shown for illustrative purposes and that various portions and/or functionality thereof described above in relation to FIG. 3 may be changed, altered, added, or removed. For example, some portions and/or functionality may be combined into a single entity without departing from the scope of the instant subject matter.

Figure 4:
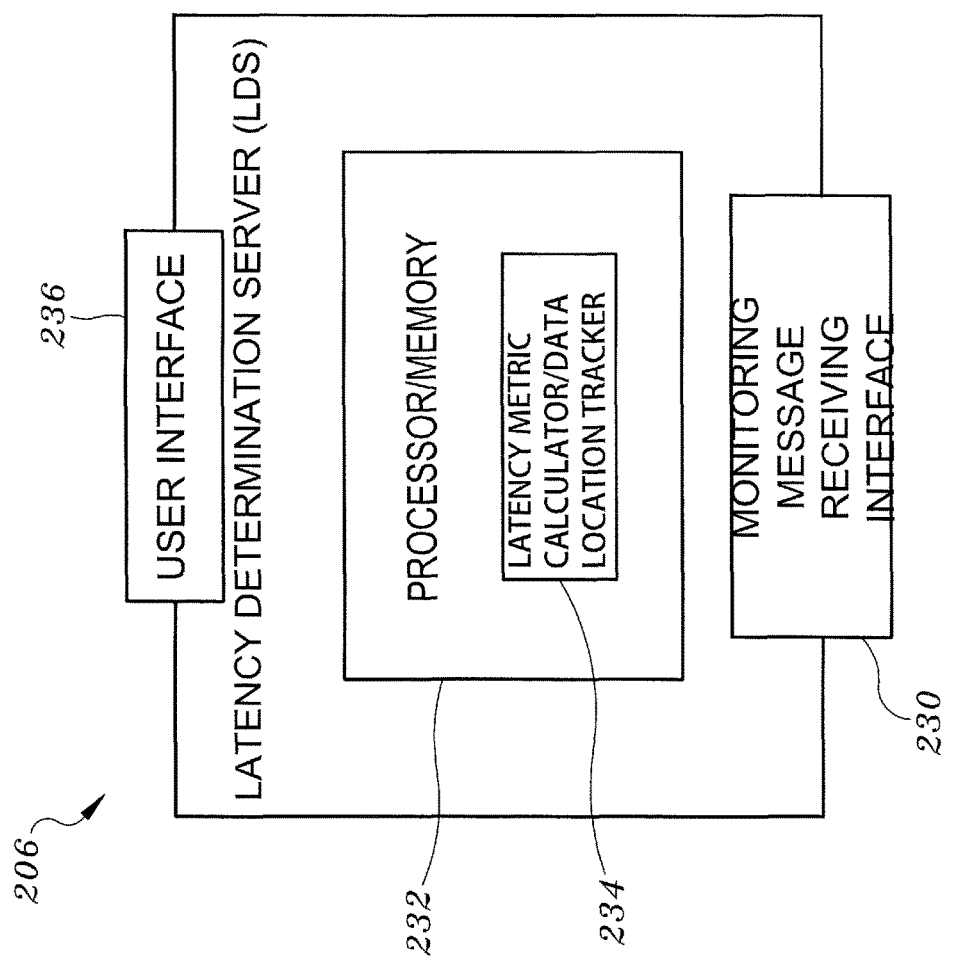
FIG. 4 is a schematic block diagram illustrating an exemplary server for determining a latency metric associated with multicast communications according to an embodiment of the subject matter described herein.

FIG. 4 is a schematic block diagram illustrating an exemplary latency determining server (LDS) 206 for receiving monitoring messages from PSNCM 204 and calculating a latency metric associated with multicast communications according to an embodiment of the subject matter described herein. LDS 206 may include any suitable entity or entities (e.g., a computing platform, software executing on a processor, etc.) for performing one or more aspects associated with calculating latency of multicast communications between hops (e.g., between physical devices within a network).

LDS 206 includes a monitoring message receiving interface 230, at least one processor and memory device 232, and a latency metric calculator and/or time-based data location tracking module 234. LDS 206 optionally includes a user interface 236 by which a visual indication of real-time global latency within a multicast network is graphically depicted. In some embodiments, LDS 206 is configured to calculate latency based upon a temporal message location analysis, without the need for additional monitoring equipment and/or complex processing. LDS 206 is configured to compute a novel latency calculation by tracking the arrival times associated with the arrival of various packet sequence numbers at various devices throughout a network.

In some embodiments, LDS 206 is adapted to receive a plurality of syslog communications simultaneously from a plurality of different PSNCMs 204 that are deployed across various network devices or nodes (e.g., hops, routers, switches, etc.) that form a multicast network, and perform a latency metric calculation via module 234. LDS 206 utilizes information contained within the syslog messages to calculate latency between each hop in a network, based upon the sequence number identifier value, the time stamp, the device ID, and/or the flow ID.

LDS 206 is configured to receive messages regarding the time of arrival of a same sequence number identifier value, thereby tracking the transmission of sequence number through devices within a network. LDS 206 tracks sequence number identifier values including an initial sequence number identifier value (e.g., packet sequence number 1), and subsequent sequence number identifier values that are incremented by a predetermined threshold value (e.g., incremented by 4, 16, 32, 64, etc.), as determined by comparator 218 (FIG. 3). In one exemplary embodiment, the predetermined threshold value is 128, thus, LDS 206 is configured to receive a syslog message from PSNCM 204 (FIG. 3) and track packet arrival times at various physical points across a multi-hop network for every 128th message. Latency monitoring and calculating can be started and/or stopped as needed, as specified by an end-user. Notably, LDS 206 enables latency within a network to be visually displayed via user interface 236. The visual display may include charts, graphs, maps, rolling windows, geographical maps, etc., for calculating real-time latency and displaying the data in near real-time.

It will be appreciated that FIG. 4 is shown for illustrative purposes and that various portions and/or functionality thereof described above in relation to FIG. 4 may be changed, altered, added, or removed. For example, some portions and/or functionality may be combined into a single entity without departing from the scope of the instant subject matter.

Figure 5:
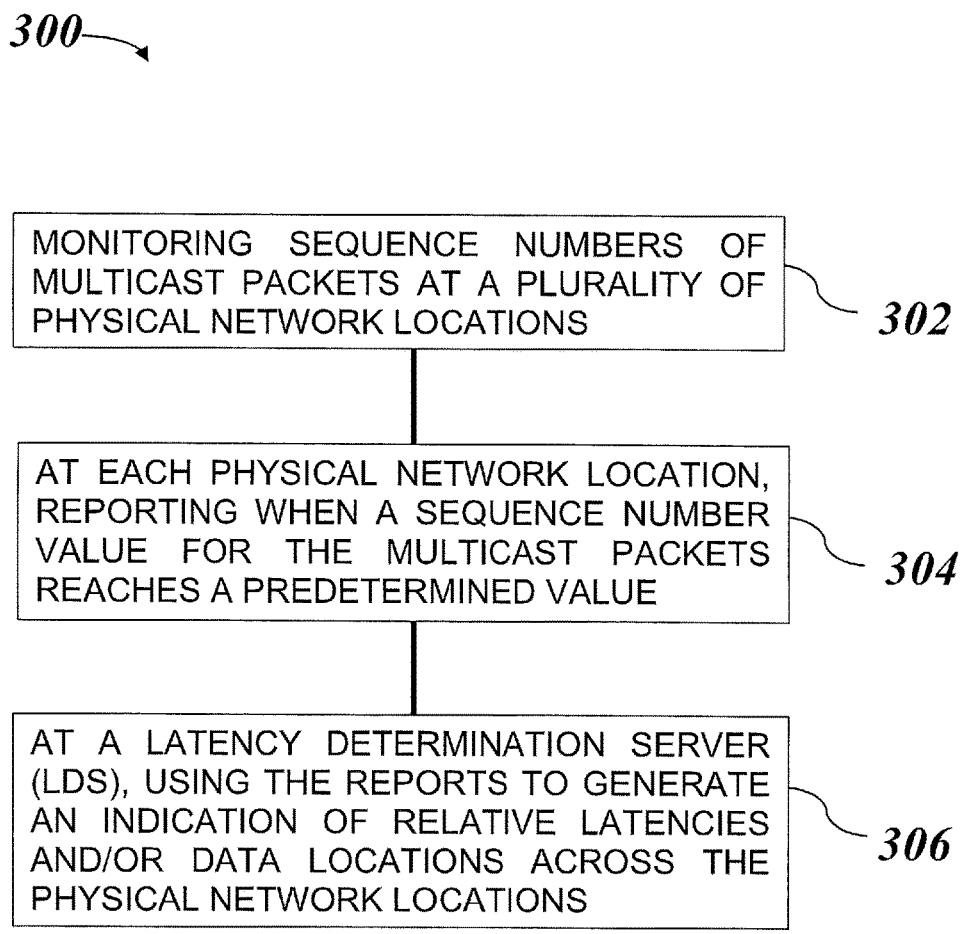
FIG. 5 is a schematic block diagram illustrating an exemplary process for monitoring latency associated with multicast communications according to an embodiment of the subject matter described herein.

FIG. 5 is a schematic block diagram illustrating an exemplary process, generally designated 300, for monitoring and determining a relative latency associated with multicast communications in a network according to an embodiment of the subject matter described herein.

In block 302, sequence numbers of multicast packets (or messages within the individual data packets) are monitored at a plurality of physical network locations. The sequence numbers include identifier values encoded within the multicast messages. Methods, systems, and computer readable media herein utilize the sequence number identifier values in a novel way for monitoring and calculating relative real-time, or near real-time, latency within a multicast network.

In block 304, each physical network location can report (e.g., to a latency determination server (LDS) when a sequence number value for the multicast packets reaches a predetermined value.

In block 306, the LDS can receiving the reports and use the reports to generate an indication of relative latencies and/or time-based data locations across the physical network locations.

In some embodiments, modules, nodes, servers, and/or computing platforms implementing the subject matter herein include a special purpose computing device (e.g., a latency monitor and/or calculator for multicast communications) usable to extract and compare sequence number values, time stamp, and/or generate events based upon sequence numbers associated with multicast packets or messages for use in passive latency monitoring applications, latency calculation applications, and/or time-based data location tracking applications.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for monitoring latency associated with multicast communications, the method comprising:
   monitoring sequence numbers of multicast messages at a plurality of physical network locations, wherein the physical network locations are hops along at least one path in a network for the multicast messages;
   at each physical network location, sending a report when a sequence number value for the multicast messages reaches a predetermined value, wherein the reports each include a sequence number associated with a monitored message and a time stamp of an arrival time at which the monitored message arrived at the respective physical network location, wherein the sequence number being reported is the same across each physical network location; and
   at a latency determination server (LDS), receiving the reports and using the reports to generate an indication of relative latencies and/or time-based data locations across the physical network locations, wherein using the reports to generate an indication of relative latencies and/or time-based data locations across the physical network locations includes generating a latency metric based upon the time stamps in the reports indicating the arrival times at which the monitored message with the same sequence number was received at the physical network locations.

2. The method of claim 1, wherein the predetermined value number is equal to a power of two.

3. The method of claim 1, wherein reporting a sequence number value comprises sending log messages to the LDS.

4. The method of claim 1, wherein the reports each include a monitored device ID and a flow ID.

5. The method of claim 1, wherein the physical network locations correspond to one of a hop, a router, a switch, a hub, a bridge, a gateway, or a probe.

6. The method of claim 1, wherein the multicast messages are generated by a multicast data messaging source.

7. The method of claim 1, wherein the multicast messages include User Datagram Protocol (UDP) packets or Pragmatic General Multicast (PGM) packets.

8. The method of claim 1, wherein the sequence numbers are pre-existing binary sequence numbers that are embedded within the multicast messages.

9. A system for monitoring latency associated with multicast communications, the system comprising:
   a plurality of physical network locations for monitoring sequence numbers of multicast messages, wherein the physical network locations are hops along at least one path in a network for the multicast messages, wherein each physical network location is configured to send a report when a sequence number value for the multicast messages reaches a predetermined value, wherein the reports each include a sequence number associated with a monitored message and a time stamp of an arrival time at which the monitored message arrived at the respective physical network location, wherein the sequence number being reported is the same across each physical network location; and a latency determination server (LDS) for receiving reports from the plurality of physical network locations and using the reports to generate an indication of a relative latencies and/or time-based data locations across the physical network locations, wherein using the reports to generate an indication of relative latencies and/or time-based data locations across the physical network locations includes generating a latency metric based upon the time stamps in the reports indicating the arrival times at which the monitored message with the same sequence number was received at the physical network locations.

10. The system of claim 9, wherein the predetermined value number is equal to a power of two.

11. The system of claim 9, wherein the reports include log messages.

12. The system of claim 9, wherein the reports each include a monitored device ID and a flow ID.

13. The system of claim 9, wherein the physical network locations correspond to one of a hop, a router, a switch, a hub, a bridge, a gateway, or a probe.

14. The system of claim 9, wherein the multicast messages are generated by a multicast data messaging source.

15. The system of claim 9, wherein the multicast messages include User Datagram Protocol (UDP) packets or Pragmatic General Multicast (PGM) packets.

16. The system of claim 9, wherein the sequence numbers are pre-existing binary sequence numbers that are embedded within the multicast messages.

17. A non-transitory computer readable medium comprising computer executable instructions embodied in the computer readable medium that when executed by a processor of a computer perform steps comprising:

monitoring sequence numbers of multicast messages at a plurality of physical network locations, wherein the physical network locations are hops along at least one path in a network for the multicast messages;

at each physical network location, sending a report when a sequence number value for the multicast messages reaches a predetermined value, wherein the reports each include a sequence number associated with a monitored message and a time stamp of an arrival time at which the monitored message arrived at the respective physical network location, wherein the sequence number being reported is the same across each physical network location; and at a latency determination server (LDS), receiving the reports and using the reports to generate an indication of relative latencies and/or time-based data locations across the physical network locations, wherein using the reports to generate an indication of relative latencies and/or time-based data locations across the physical network locations includes generating a latency metric based upon the time stamps in the reports indicating the arrival times at which the monitored message with the same sequence number was received at the physical network locations.

* * * * *